(12) United States Patent
Buenger et al.

(10) Patent No.: US 9,227,584 B2
(45) Date of Patent: Jan. 5, 2016

(54) SUPPORT DEVICE

(71) Applicant: GM Global Technology Operations LLC, Detroit, MI (US)

(72) Inventors: Benjamin Buenger, Bischofsheim (DE); Andreas Woisnitza, Mainz (DE); Heiko Schultheiss, Hombeg/Ohm (DE); Martin Leonhard Sachs, Roedermark (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/656,416

(22) Filed: Oct. 19, 2012

(65) Prior Publication Data
US 2013/0113225 A1 May 9, 2013

(30) Foreign Application Priority Data
Oct. 20, 2011 (DE) .......... 10 2011 116 455

(51) Int. Cl.
*B60R 19/34* (2006.01)
*B60R 21/34* (2011.01)
*B60R 19/26* (2006.01)
*B60R 19/12* (2006.01)

(52) U.S. Cl.
CPC .............. *B60R 19/26* (2013.01); *B60R 19/12* (2013.01)

(58) Field of Classification Search
CPC ........ B60R 19/12; B60R 19/34; B60R 19/46; B60R 19/56; B60R 21/34
USPC ........... 296/187.04, 187.09, 193.09; 293/102, 293/132, 133
See application file for complete search history.

(56) References Cited

U.S. PATENT DOCUMENTS

| | | | |
|---|---|---|---|
| 6,398,275 B1 * | 6/2002 | Hartel et al. .................. | 293/102 |
| 7,284,788 B1 | 10/2007 | Barbat et al. | |
| 7,699,383 B2 * | 4/2010 | Fukukawa et al. ....... | 296/187.04 |
| 7,735,226 B2 * | 6/2010 | Riviere et al. ................ | 29/897.2 |
| 7,735,902 B2 * | 6/2010 | Wurtemberger ......... | 296/187.09 |
| 7,802,839 B2 * | 9/2010 | Ajisaka .................... | 296/187.09 |
| 7,887,121 B2 * | 2/2011 | Hasegawa et al. ....... | 296/187.04 |
| 7,984,943 B2 * | 7/2011 | Iwano et al. ............. | 296/193.11 |
| 8,042,847 B2 * | 10/2011 | Garg et al. .................... | 293/102 |
| 8,191,959 B2 * | 6/2012 | Ritz ......................... | 296/187.09 |

(Continued)

FOREIGN PATENT DOCUMENTS

| | | |
|---|---|---|
| DE | 4040459 A1 | 6/1992 |
| DE | 19943622 A1 | 4/2001 |

(Continued)

OTHER PUBLICATIONS

German Patent Office, German Search Report for Application No. 102011116455.7, dated Jul. 3, 2012.

*Primary Examiner* — Gregory Blankenship
(74) *Attorney, Agent, or Firm* — Ingrassia Fisher & Lorenz PC

(57) ABSTRACT

In various embodiments, a support device is provided for at least one covering element, in particular of a bumper device of a motor vehicle having at least one support body, on which at least one covering element can be arranged or is arranged, and having at least one support unit, which can be fixed or is fixed to the support body and to a vehicle structure or an impact device, which supports the support body when a load acting on the support body is less than a defined load and which releases the support body for a movement when the load acting on the support body exceeds the defined load.

12 Claims, 2 Drawing Sheets

(56) References Cited

U.S. PATENT DOCUMENTS

| | | | |
|---|---|---|---|
| 8,267,446 B2 * | 9/2012 | Gonin | 293/136 |
| 8,424,629 B2 * | 4/2013 | Ralston et al. | 180/274 |
| 8,440,279 B2 * | 5/2013 | Riviere et al. | 428/35.7 |
| 8,485,588 B1 * | 7/2013 | Voss et al. | 296/187.04 |
| 8,491,038 B2 * | 7/2013 | Challal et al. | 296/187.09 |
| 8,496,287 B2 * | 7/2013 | Matsuura et al. | 296/187.09 |
| 2009/0026806 A1 * | 1/2009 | Riviere et al. | 296/193.09 |
| 2009/0102235 A1 * | 4/2009 | Ajisaka | 296/187.03 |
| 2009/0160203 A1 * | 6/2009 | Garg et al. | 293/120 |
| 2010/0052342 A1 * | 3/2010 | Wurtemberger | 293/132 |
| 2010/0213742 A1 * | 8/2010 | Ritz | 296/193.09 |
| 2010/0314907 A1 * | 12/2010 | Iwano et al. | 296/187.09 |

FOREIGN PATENT DOCUMENTS

| | | |
|---|---|---|
| DE | 10045508 A1 | 4/2002 |
| DE | 10102187 A1 | 8/2002 |
| DE | 60017197 T2 | 12/2005 |
| EP | 2263919 A1 | 12/2010 |
| GB | 182372 A | 7/1922 |
| GB | 277481 A | 9/1927 |
| GB | 1397757 A | 6/1975 |
| GB | 2043203 A | 10/1980 |
| GB | 2394920 A | 5/2004 |
| JP | 11078734 A | 3/1999 |
| JP | 2001039242 A | 2/2001 |
| WO | 2005085009 A1 | 9/2005 |
| WO | 2010109405 A1 | 9/2010 |

\* cited by examiner

SUPPORT DEVICE

CROSS-REFERENCE TO RELATED APPLICATION

This application claims priority to German Patent Application No. 10 2011 116 455.7, filed Oct. 20, 2011, which is incorporated herein by reference in its entirety.

TECHNICAL FIELD

The technical field relates to a support device for at least one covering element, in particular of a bumper device of a motor vehicle, a support unit and a support body for such a support device as well as a motor vehicle for such a support device.

BACKGROUND

Bumper devices and support devices are known with motor vehicles for example in the front region. On the support devices, the fascia is supported, which for example comprises bumper elements such as bumper skin or covering.

The bumper device is designed in order to deform on the exceeding of a defined load for example an impact and to absorb energy by doing so.

With the known bumper devices and with the known support devices it has proved to be disadvantageous that the plurality of the individual parts of the support device are plastically deformed through the exceeding of the defined load, which proves to be time-consuming and cost-intensive for a restoration of the support device.

Accordingly, it is desirable to propose a support device, a support unit and a support body for the support device as well as a bumper device, wherein the absorption action is increased and wherein a restoration, for example after a collision, can be realized quickly and cost-effectively.

SUMMARY

According to various embodiments, a support device is provided with at least one covering element, in particular of a bumper device of a motor vehicle having at least one support body on which at least one covering element can be arranged or is arranged, and having at least one support unit which can be fixed or is fixed to the support body and on a vehicle structure or an impact device, which supports the support body when a load acting on the support body is smaller than a defined load and which releases the support body for a movement when the load acting on the support body exceeds the defined load.

The covering element can for example comprise a fascia, in particular a bumper covering or bumper skin. The impact device can for example comprise a bumper.

In a normal state, the load acting on the support body comprises the weight force of the individual parts of the support device as well as the weight of the covering element. The defined load comprises a load acting on the support body for example as a result of an impact. The defined load is for example exceeded at a force of 1 kN.

In that the support unit releases a movement of the support body when the load acting on the support body exceeds the defined load, an evasive movement of the support body is made possible so that it is not plastically deformed or at least only little so. In that the support unit otherwise supports the support body, the at least one covering element can be easily carried by the support body. Because of this, the number of the individual parts of the support device that have to be replaced as a consequence of an impact on the one hand can be reduced and an improved absorption action of the support device can be realized.

Here it proves to be frequently advantageous when the support unit comprises an absorption means, which cushions and/or dampens the movement of the support body. In addition to this, it proves advantageous when the support body comprises a first fastening portion, with which the support unit can be fixed to or is fixed to the vehicle structure or to the impact device releasably or non-releasably, and/or a second fastening portion with which the support unit can be fixed to or is fixed to the support body in a releasable or non-releasable manner.

When the support unit can be releasably fixed to the vehicle structure or to the impact device and/or to the support body, the support unit can be fixed or replaced in a simple manner. In such a case it is conceivable for example that after an impact merely the at least one support unit is replaced.

When the support unit is non-releasably fixed to the vehicle structure or to the impact device and to the support body it can for example be glued or welded. In principle it is also conceivable that the support unit and the support body comprise a common component.

When the support unit is releasably fixed to the vehicle structure or to the impact device and to the support body, it can for example be screwed, glued or fixed by means of a positive-joined connection to said support body.

In order to increase the loadabilities and the stiffness of the support unit it proves advantageous when the support unit comprises a flat material and/or wherein the support unit has a U-shaped cross section, which in particular is opened in the direction of the support body side.

In that the support unit can be designed as flat material, it can be cost-effectively produced. When the support unit has a U-shaped cross section, the stiffness of the support unit is increased.

The absorption means of the support unit can be designed in any way in principle. For example, a spring can be arranged between the first fastening portion and the second fastening portion. However, it proves advantageous when the absorption means are formed by an S-shaped profile of the support unit which is deformable on exceeding the defined load.

Through the S-shaped profile of the support unit, the support unit can absorb up to the exceeding of the defined loads without being elastically deformed. Following the exceeding of the defined load, the support unit is deformed. This deforming can comprise a plastic deformation and/or a breaking of the support unit. Because of this, an absorption means is formed in a simple manner.

In various embodiments, the support unit can break after the exceeding of the defined load, for example when it comprises a plastic. It is additionally conceivable that the support unit in such a case is plastically deformed before the breaking.

In addition to this, it is provided with an embodiment of the support device with the support unit when it supports the support body has its greatest extension in the direction of the vertical vehicle axis.

In various embodiments, the direction of the greatest extension of the support body is arranged transversely to the direction of the greatest extension of the support unit when the support unit supports the support body. The support body on the one hand is fixed to the at least one support unit. It is conceivable, in principle that the support body is exclusively supported through the at least one support unit.

In addition to this it is conceivable that the support body can be fixed or is fixed directly to a vehicle structure. However, it proves advantageous when the support body can be arranged or is arranged on at least one bearing means, which can be fixed or is fixed to the vehicle structure.

In order to increase the stability of the support device it proves advantageous when the support body on a side facing the bearing means comprises a support portion with U-shaped cross section, which in particular is open on the side facing away from the load, with which the support body is arranged at least partially on the or a receiving portion of the bearing means designed in particular corresponding to the support portion of the support body.

It is conceivable in principle that the support body can be arranged elastically moveably on the bearing means. However, it proves to be advantageous when the support body is arranged on the bearing means rotatable about a rotary axis and/or wherein the rotary axis is arranged parallel to the direction of the longest extension of the support body.

In that the support body is rotatably arranged on the bearing means and in that the support unit releases a movement of the support body when the load acting on the support body exceeds the defined load, the support body rotates about the rotary axis when the load acting on the support body exceeds the defined load, as a result of which a good damping action can be achieved. In addition, a plastic deformation of the support body can be avoided or at least reduced because of this.

As a further development of the last-mentioned inventive idea it proves to be advantageous when the bearing means and the support body are fixed to each other by means of a screw and/or bolt connection and/or wherein the rotary axis is formed through the screw and/or bolt connection.

Because of this, an absorption means can be easily formed on the bearing means, in that a resistance of the rotary movement of the support body about the rotary axis can be adjusted through the tightening forces of the screw or bolt connection.

With an embodiment of the support device it is provided that the support body comprises two support portions which with respect of the vehicle width direction are arranged on the respective lateral ends and/or wherein the support body is arranged on two support means and two bearing means arranged correspondingly to the support portions. Here, the support body is held in four places as a result of which a stable arrangement of the support device can be created.

In addition to this, the object is solved through a support unit for a support device, in particular with one of the previously mentioned features, which can be fixed or is fixed to a support body of the support unit and to a vehicle structure or to an impact device, which supports the support body when a load acting on the support body is less than a defined load and releases the support body for a movement when the load acting on the support body exceeds the defined load.

In addition to this, the object is solved through a support body on which at least one covering element can be arranged or is arranged for a support device, in particular having one of the previously mentioned features, which on the one hand can be or is rotatably arranged on a support unit and on the other hand on at least one bearing means.

Finally, the object is solved through a bumper device for a motor vehicle having a support device, in particular with one of the previously mentioned features.

In that the support unit releases the support body for a movement when the load acting on the support body exceeds the defined load, a high damping action can be achieved through the support device.

In that the support unit is deformed on exceeding the defined load, the absorption means of the support unit is formed by this in a cost-effective manner.

Through the releasable fixing of the support unit to the vehicle structure or to the impact device, as well as to the support body, it can be easily replaced for example following a plastic deformation and replaced with new support units. The restoration of the support device proves to be simple and cost-effective because of this.

BRIEF DESCRIPTION OF THE DRAWINGS

The present disclosure will hereinafter be described in conjunction with the following drawing figures, wherein like numerals denote like elements, and.

DETAILED DESCRIPTION

Figure 1:
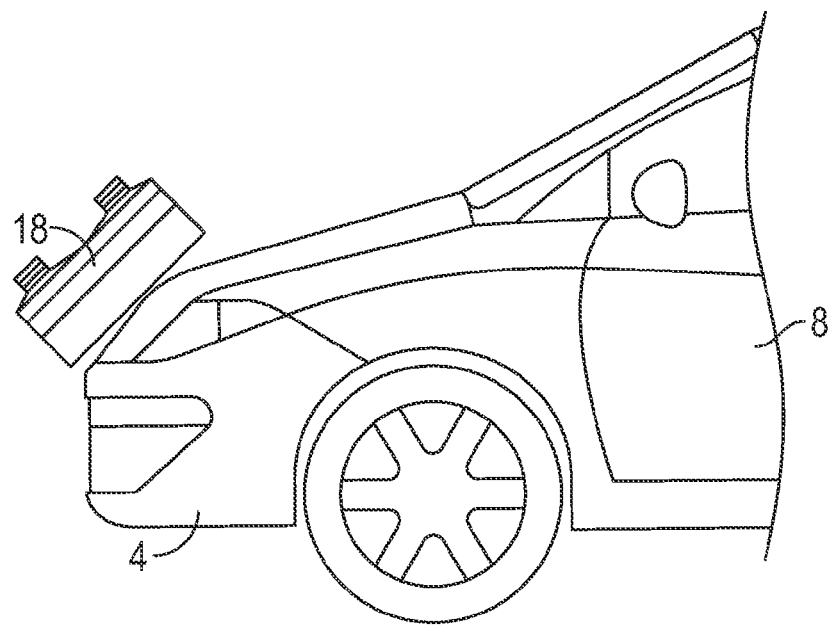
FIG. 1 is a schematic representation of an arrangement of a support device in a motor vehicle in accordance with various embodiments.

The following detailed description is merely exemplary in nature and is not intended to limit the disclosure or its application and uses. Furthermore, there is no intention to be bound by any theory presented in the preceding background or the following detailed description.

The Figures show the support device on the whole provided with the reference number 2. On the support device 2, at least one covering element 4 of a bumper device 6 of a motor vehicle 8 can be arranged.

The support device 2 comprises a support body 10, on which the covering element 4 is arranged. The support body 10 on the one hand is fixed through two support units 12 and on the other hand through two bearing means 14.

With the exemplary embodiment evident in the Figures, the two support units 12 with their end facing away from the support body 10 are fixed to an impact device 16 of the bumper device 6.

The two support units 12 are formed in such a manner that they support the support body 10. When the load acting on the support body 10 exceeds a defined load 18, the support unit 12 releases the support body 10 for a movement.

Figure 2:
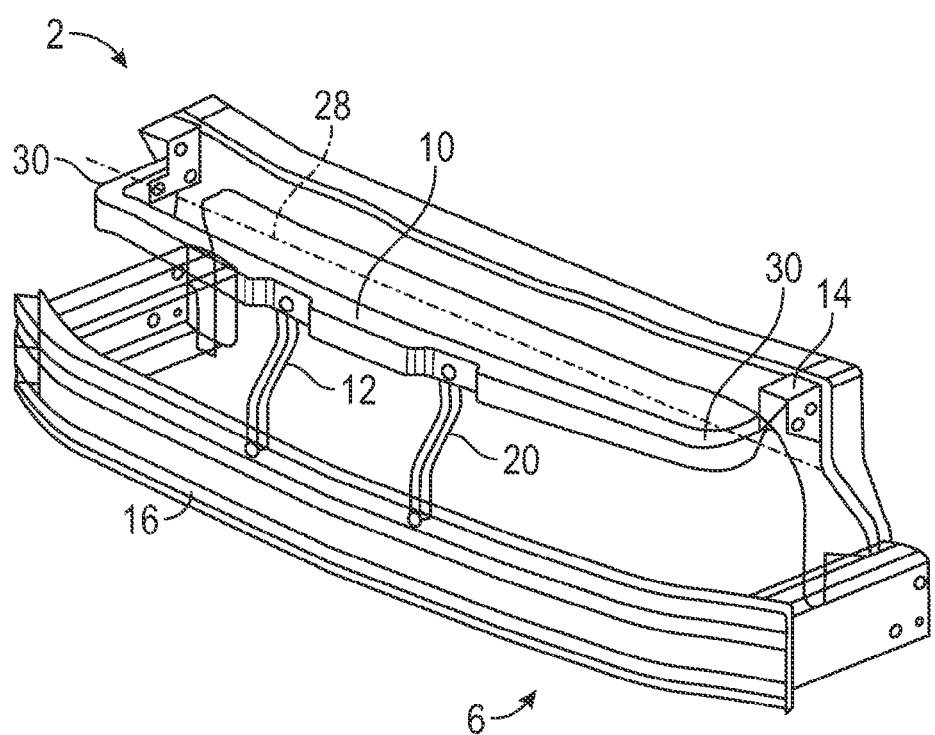
FIG. 2 is a perspective representation of a support device according to various embodiments.
Figure 3:
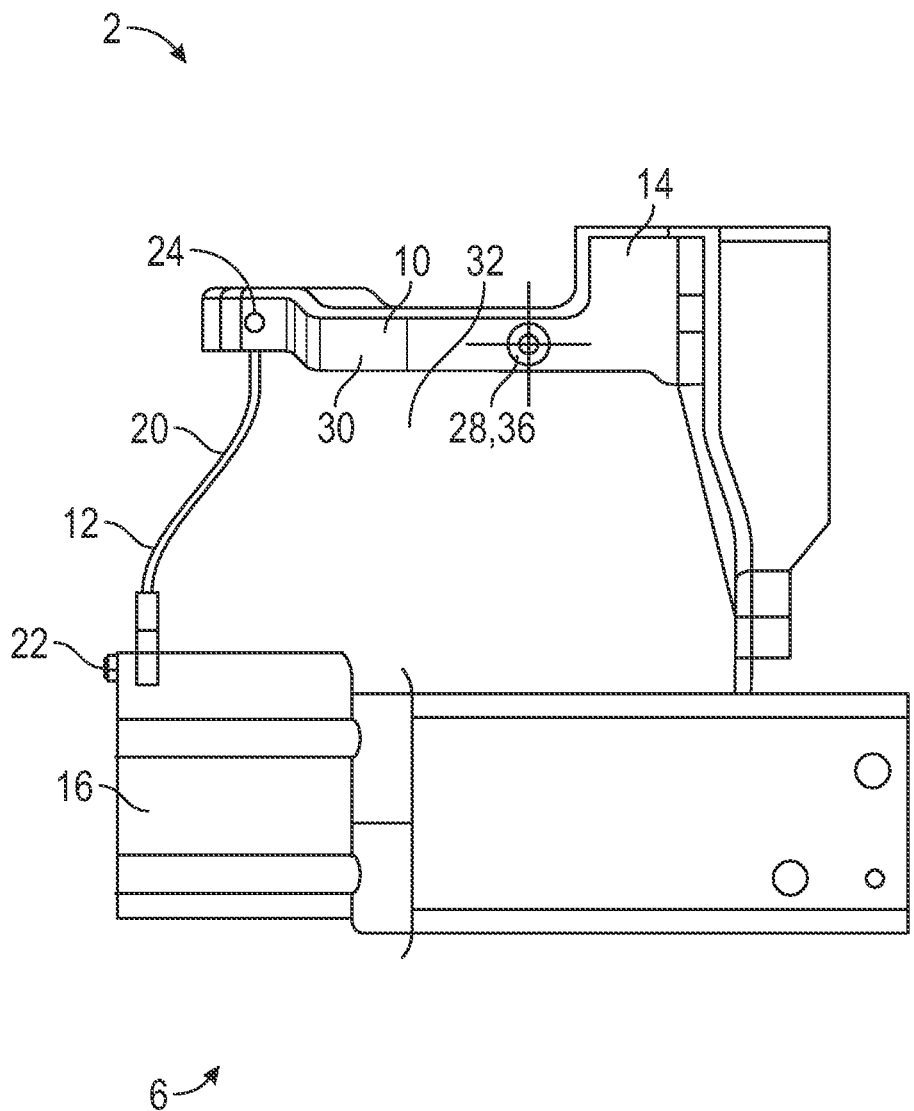
FIG. 3 is a lateral view of the support device according to FIG. 2.

By means of the FIGS. 2 and 3 the support device 2 is explained in more detail. Each support unit 12 comprises an absorption means 20, which cushions and/or dampens the movement of the support body 10 on exceeding the defined load 18.

On the side facing the impact device 16, the support unit 12 comprises a first fastening portion 22, with which the support unit 12 is releasably fixed to the impact device 16. On the side facing the support body 10, the support unit 12 comprises a second fastening portion 24, with which the support unit 12 is releasably fixed to the support body 10.

In order to increase the stiffness and the strength of the support unit 12, it has a U-shaped cross section.

With the exemplary embodiment shown in the FIGS. 2 and 3, the absorption means 20 is formed by an S-shaped profile of the support unit 12, which can be plastically deformed on exceeding the defined load 18. Because of this, the movement of the support body 10 is dampened when the load acting on the support body 10 exceeds the defined load 18.

The support body 10 is rotatably arranged on the bearing means 14 by means of a screw connection 26. Because of this, it rotates during the movement about a rotary axis 28. The rotary axis 28 in this case runs parallel to the direction of the longest extension of the support body 10.

In order to achieve a stable arrangement of the support device 2, the support body 10 has U-shaped support portions 30 on the side facing the bearing means 14. These are also located corresponding to the receiving portions 32 of the bearing means 14 formed corresponding to the support portions 30 of the support body 10.

The operation of the support device 2 is presented in the following steps. When the load acting on the support body 10 exceeds the defined load 18, the support unit 12 commences deforming through an absorption means 20 formed through an S-shaped profile of the support unit 12. Here, the support body 10 rotates about the rotary axis 28. Because of this it is achieved that with the support device 2 merely the support units 12 are plastically deformed, whereas the support body 10 and the bearing means 14 are accessible for a further use.

The features of the invention disclosed in the above description, in the claims and in the drawing can be substantial to the realization of the invention in its different embodiments both individually as well as in any desired combination.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A support device for at least one covering element of a motor vehicle, comprising:
   at least one support body, on which at least one covering element is arranged;
   at least one support unit, which is fixed to the support body and to a vehicle structure or an impact device, which supports the support body when a load acting on the support body is smaller than a defined load and which releases the support body for a movement when the load acting on the support body exceeds the defined load; and
   at least one bearing means fixed to the vehicle structure, wherein the support body is rotatably arranged on the at least one bearing means, wherein the support body on a side facing the at least one bearing means comprises: a U-shaped support portion, which is open on a side facing away from the load, with which the support body at least partially is arranged on a receiving portion of the at least one bearing means.

2. The support device according to claim 1, wherein the support unit comprises absorption means, which cushions or dampens the movement of the support body.

3. The support device according to claim 1, wherein the support unit comprises:
   a first fastening portion, with which the support unit is fixed releasably or non-releasably to the vehicle structure or to the impact device; and
   a second fastening portion, with which the support unit is fixed releasably or non-releasably to the support body.

4. The support device according to claim 1, wherein the support unit has a U-shaped cross section, which is opened in particular on a side facing the support body.

5. The support device according to claim 2, wherein the absorption means is formed through an S-shaped profile of the support unit, which is deformed on exceeding the defined load.

6. The support device according to claim 1, wherein the support unit, when it supports the support body, has its greatest extension in a direction of a vertical motor vehicle axis.

7. The support device according to claim 1, wherein a direction of the greatest extension of the support body is arranged transversely to a direction of the greatest extension of the support unit when the support unit supports the support body.

8. The support device according to claim 1, wherein the support body is rotatably arranged on the at least one bearing means about a rotary axis or wherein the rotary axis is arranged parallel to the direction of a longest extension of the support body.

9. The support device according to claim 1, wherein the at least one bearing means and the support body are rotatably fixed to one another by a screw or bolt connection, and wherein the rotary axis is formed through the screw or bolt connection.

10. The support device according to claim 1, wherein the support body comprises two support portions, which with respect to a vehicle width direction are arranged on the respective lateral ends or wherein the support body is arranged on two support means and two bearing means arranged correspondingly to the support portions.

11. A bumper device for a motor vehicle having a support device, the support device comprising:
   at least one support body, on which at least one covering element is arranged;
   at least one support unit, which is fixed to the support body and to a vehicle structure or an impact device, which supports the support body when a load acting on the support body is smaller than a defined load and which releases the support body for a movement when the load acting on the support body exceeds the defined load; and
   at least one bearing means fixed to the vehicle structure, wherein the support body is rotatably arranged on the at least one bearing means, wherein the support body on a side facing the at least one bearing means comprises: a U-shaped support portion, which is open on a side facing away from the load, with which the support body at least partially is arranged on a receiving portion of the at least one bearing means.

12. A support device for at least one covering element of a motor vehicle, comprising:
   at least one support body, on which at least one covering element is arranged;
   at least one support unit, which is fixed to the support body and to a vehicle structure or an impact device, which supports the support body when a load acting on the support body is smaller than a defined load and which releases the support body for a movement when the load acting on the support body exceeds the defined load; and
   at least one bearing means fixed to the vehicle structure, wherein the support body is rotatably arranged on the at least one bearing means about a rotary axis that is arranged parallel to the direction of a longest extension of the support body, wherein the support body on a side facing the at least one bearing means comprises: a U-shaped support portion, which is open on a side facing away from the load, with which the support body at least partially is arranged on a receiving portion of the at least one bearing means.

* * * * *